United States Patent Office 2,775,225
Patented Dec. 25, 1956

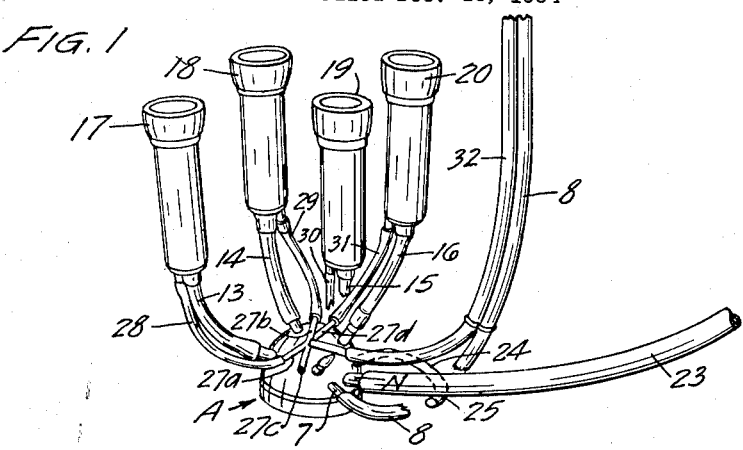
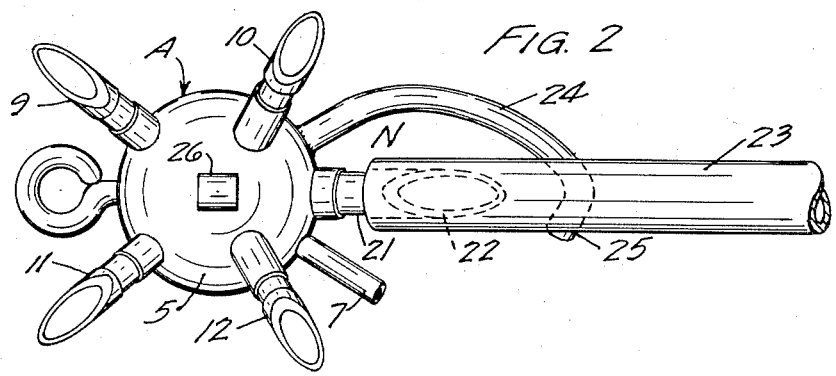
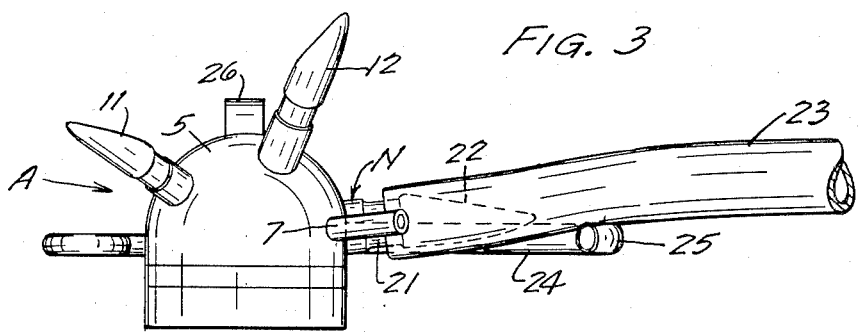
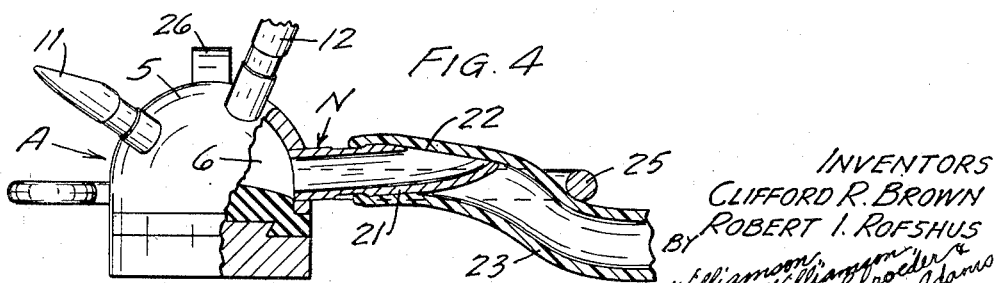

2,775,225

MILKING MACHINE CLAW ASSEMBLY

Clifford R. Brown and Robert I. Rofshus, Albert Lea, Minn., assignors to National Cooperatives, Inc., Chicago, Ill., and Albert Lea, Minn., a corporation of the District of Columbia Application December 15, 1954, Serial No. 475,485

6 Claims. (Cl. 119—14.54)

This invention relates to milking machines. More particularly, it relates to milking machine claw assemblies for use in milking machine units to connect the inflations of the machine to the necessary sources of suction and to provide a collection chamber for the milk preparatory to its transmittal to a main or central milk line under suction.

In milking machines of the type wherein no milk pail is utilized, it is conventional to provide a milk claw assembly which provides a collection chamber for the milk as it is withdrawn from the cow. Such a milk claw assembly is usually constructed to introduce air in such a way as to force the milk out of the claw into a central milk line under suction. In addition, it usually carries a main suction line with various branches attached to the individual inflations to effect their operation. In the use of such milking machines, separate spigots are normally required in the milk line so that the suction can be cut off in order that the inflations will release the teats and hence may be readily removed from the teats of the cow without discomfort to the cow. Also, the inflations are commonly dipped in a detergent solution after completing the milking of each cow and prior to milking the next cow. Unless such a spigot or some other satisfactory means for shutting off the flow of air and milk through the milk line is provided, the detergent will be sucked upwardly into the claw assembly and the milk will become contaminated. These spigots, however, are costly and difficult to maintain in a sanitary condition. In addition, they are usually removed from a position adjacent to the claw assembly and inflations so that it is difficult for a single operator to prevent the inflations from dropping to the floor and becoming contaminated when the spigot is closed. Our invention is designed to eliminate these disadvantages.

It is a general object of our invention to provide novel and improved means for cutting off the suction to the inflations of a milking machine which will eliminate the danger of contamination of the milk.

A more specific object is to provide novel and improved means for cutting off the suction to the inflations of a milking machine which is substantially less expensive to manufacture than a spigot and is substantially simpler to operate.

Another object is to provide a novel and improved claw assembly having simple and inexpensive inherent means for cutting off the suction to the inflations of a milking machine.

Another object is to provide a novel and improved claw assembly constructed to adapt the same to turn the suction to the inflations off and on again by merely swinging the milk tube from one position to another position closely adjacent thereto.

These and other objects and advantages of our invention will more fully appear from the following description made in connection with the accompanying drawings, wherein like reference characters refer to the same or similar parts throughout the several views, and in which:

Fig. 1 is a general perspective view of one embodiment of our invention shown with inflations and a milk withdrawal tube connected thereto.

Fig. 2 is a top plan view on an enlarged scale of a claw assembly embodying our invention.

Fig. 3 is a side elevational view on an enlarged scale of the same with the milk tube connected thereto in milk-conducting position.

Fig. 4 is a side elevational view on an enlarged scale, partly in section with the milk tube shown connected thereto in shut-off position.

One embodiment of our invention, as shown in Figs. 1–4, may include a claw assembly indicated generally as A. This claw assembly is comprised of a rigid dome-shaped body 5 which has a hollow interior or milk collection chamber 6. As shown, it is provided with an air inlet 7 which, as shown in Fig. 1, is connected to a tube 8 which leads to a controlled source of air, the air being admitted through an opening considerably smaller in diameter than the opening of the air inlet 7.

As best shown in Fig. 2, there is mounted on the rigid hollow body 5 a plurality of milk claw nipples 9, 10, 11 and 12. As shown, these milk claw nipples extend upwardly and outwardly from the body 5 and are in fluid communication with the hollow interior 6 of the body 5. Each of these milk claw nipples is adapted to be connected to individual milk tubes such as 13, 14, 15 and 16 which connect the nipples to the individual inflations such as 17, 18, 19 and 20.

As best shown in Figs. 2, 3 and 4, there is provided a milk outlet nipple indicated generally as N which is mounted on the body 5 and extends outwardly and slightly upwardly therefrom. This milk outlet nipple N has an outer end portion 21 which is cut away in a plane extending at an acute angle relative to the longitudinal axis of the nipple N, as best shown in Figs. 3 and 4, to form an elliptically shaped crimping surface 22, as best shown in Fig. 2. This crimping surface 22, as shown in Figs. 2, 3 and 4, faces upwardly although, of course, it may face in any direction lateral of the nipple N so long as the associated shut-off arm to be hereinafter described is mounted accordingly. The milk outlet nipple N, of course, is in fluid communication with the hollow interior 6 of the body 5 so that the milk collected therein may pass outwardly through the nipple N. A flexible milk tube 23 is shown slid over the outer end portion 21 of the nipple N and this milk tube leads to a main or central milk line (not shown) under suction.

Mounted on the body 5 and extending outwardly therefrom in the same general direction as the milk outlet nipple N is a milk tube shut-off arm 24. This milk tube shut-off arm has its outer end portion 25 bent into a hook-shape, as can best be seen in Fig. 2. This hook-shaped outer end portion 25 extends outwardly beyond the outer end of the milk outlet nipple N but adjacent thereto and across the vertical longitudinal plane of that outlet. This can best be seen by reference to Fig. 2. As shown, however, this hook-shaped outer end portion 25 of the shut-off arm 24 is positioned on the side of the longitudinal axis of the milk outlet nipple N opposite to the direction in which the crimping surface 22 faces. As can best be seen through reference to Figs. 3 and 4, the distance between the outer end of the milk outlet nipple N and the hook-shaped outer end portion 25 of the shut-off arm 24 is less than the outer diameter of the milk tube 23.

As shown, there is provided a sleeve-type bracket 26 at the top of the rigid body 5 within which a suction T 27 is mounted. This suction T 27 has four branches 27a, 27b, 27c and 27d, each of which is connected to one of the inflation casings of the inflations 17, 18, 19 and 20 by pulsating tubes such as 28, 29, 30 and 31. The suction T is connected by a suction tube 32 to a source of vacuum (not shown) controlled by a pulsator (not shown).

Fig. 3 shows the milk tube 23 secured to the milk outlet nipple 21 and in milk conducting position relative to the milk tube shut-off arm 24. In other words, the milk tube passes above the hook-shaped portion 25 of the shut-off arm 24 so that the milk may flow freely through the milk outlet nipple N and so that the interior of the body 5 and of the inflations 17, 18, 19 and 20 will be subjected to suction as transmitted from the milk tube 23 and the milk outlet nipple N. This is the position in which the milk tube 23 will extend during the milking operation.

When it is desired to remove the inflations 17, 18, 19 and 20 from the teats of the cow, the milk tube 23 is swung laterally around the free end of the hook-shaped portion 25 of the shut-off arm 24 to a position beneath the hook-shaped portion, as is shown in Fig. 4. When this is done, the flexible milk tube will be crimped along the crimping surface 22 of the milk outlet 20 so that suction cannot be transmitted from the milk suction tube 23 through the milk outlet nipple N to the interior of the body 5 and the interior of the inflations 17, 18, 19 and 20. When this takes place, the inflation will release the teats of the cow so that they may be readily removed from the teats without any attendant discomfort to the cow. Since the milk claw assembly A is in close proximity to the inflations 17, 18, 19 and 20, a single operator may swing the milk tube 23 to the shut-off position shown in Fig. 4 and at the same time support the inflations 17, 18, 19 and 20 so as to avoid their dropping downwardly upon the floor of the barn and thereby becoming contaminated. Also, the operator may immediately dip the inflations 17, 18, 19 and 20 into a detergent solution without any danger of some of the detergent being sucked up into the inflations and into the milk line and thereby contaminate the milk. This can all be done without any need for the operator first walking to a point well removed from the inflations and then returning to accomplish the above operations. It is apparent, of course, that in the same manner the inflations may be applied to the teats of another cow to be milked and the suction applied thereto with considerably greater facility than if the operator has to first turn on the suction by way of a spigot and thereafter apply the inflations to the teats of the cow.

Thus it can be readily seen that our claw assembly has a considerable advantage in simplicity and handiness. Considerable inconvenience is avoided and a substantial saving in time is effected through the use of my novel claw assembly. In addition, it insures more sanitary handling of the milking equipment and thereby avoids contamination of the milk.

In addition to the advantages of simplicity and handiness, it should be noted that our claw assembly is quite inexpensive to manufacture and simple to operate. It obviates a number of prior sanitation problems and at the same time effects a substantial saving in cost of equipment required for the satisfactory use of pailless milking machines.

It will also be noted that there is nothing to wear out and hence no replacement of parts is required when our milking machine claw assembly is used. Also, there are no additional parts to be cleaned and there is no place for dirt or fats to collect to develop high bacteria counts as is the case when spigots are used.

It will, of course, be understood that various changes may be made in the form, details, arrangement and proportions of the various parts without departing from the scope of our invention.

What is claimed is:

1. A milking machine claw assembly comprising a rigid body having an air inlet and a hollow interior, at least one milk nipple mounted on said body and extending outwardly therefrom and being in fluid communication with the hollow interior of said body and being adapted to be connected to the milk tube of an inflation to conduct milk from the latter into the hollow interior of said body, a milk outlet nipple mounted on said body and extending outwardly therefrom and being in fluid communication with the hollow interior of said body and being adapted to have a flexible milk tube under suction connected thereto, the outer end portion of said milk outlet nipple having a milk tube crimping surface, and a rigid milk-tube-shut-off arm mounted on said body and extending away therefrom in the same general direction as said milk outlet nipple to a position almost directly ahead and beyond but adjacent to the outer end portion of said milk outlet nipple whereby such a flexible milk tube when connected to said milk outlet nipple may extend in milk conducting position while at one side of said arm and will be crimped against the crimping surface of said milk outlet nipple when swung to the other side of said arm to effectively shut off the fluid flow through the milk tube.

2. A milking machine claw assembly comprising a rigid body having an air inlet and a hollow interior, a plurality of milk claw nipples mounted on said body and extending outwardly therefrom and being in fluid communication with the hollow interior of said body and each being adapted to be connected to the milk tube of an inflation to conduct milk from the latter into the hollow interior of said body, a milk outlet nipple mounted on said body and extending outwardly therefrom and being in fluid communication with the hollow interior of said body and being adapted to have a flexible milk tube under suction connected thereto, the outer end portion of said milk outlet nipple having a milk tube crimping surface, and a rigid milk-tube shut-off arm mounted on said body adjacent said milk outlet nipple and extending outwardly away from the same in the same general direction as said milk outlet nipple and across the vertical longitudinal plane thereof just outwardly of the outer end of said nipple whereby such a flexible milk tube, when connected to said milk outlet nipple, may extend in milk-conducting relation while at one side of said arm and will be crimped against the crimping surface of said milk outlet nipple when swung to the other side of said arm to effectively shut off the fluid flow through the milk tube.

3. The structure defined in claim 2, wherein the milk tube crimping surface of said milk outlet nipple faces upwardly and the outer end portion of said milk tube shut-off arm is disposed just below the outer end of said milk outlet nipple.

4. A milking machine claw assembly comprising a rigid body having an air inlet and a hollow interior, a plurality of milk claw nipples mounted on said body and extending outwardly therefrom and being in fluid communication with the hollow interior of said body and each being adapted to be connected to the milk tube of an inflation to conduct milk from the latter into the hollow interior of said body, a milk outlet nipple mounted on said body and extending outwardly therefrom and being in fluid communication with the hollow interior of said body and being adapted to have a flexible milk tube under suction connected thereto, the outer end portion of said milk outlet nipple being cut away along a plane extending at an acute angle relative to the longitudinal axis of said milk outlet nipple to form a milk tube crimping surface around the discharge-defining portions of said milk outlet nipple, and a rigid milk tube shut-off arm mounted on said body adjacent said milk outlet nipple and extending outwardly therefrom in the same general direction as said milk outlet nipple, the outer end portion of said arm being disposed to the side of the longitudinal axis of said milk outlet nipple opposite to the direction the crimping surface of said milk outlet nipple faces, said outer end portion of said arm being disposed outwardly of but adjacent to the outer end portion of said milk outlet nipple and extending across the longitudinal plane thereof substantially normal to the plane in which its outer end portion is cut whereby such a flexible milk tube, when connected to said milk outlet nipple, will extend in milk-conducting relation while at one side of said arm and will be crimped against the crimping surface of said milk outlet nipple when swung to the other side of said arm to effectively shut off the fluid flow through the milk tube.

5. The structure defined in claim 4 and a flexible milk tube connected to said milk outlet nipple and extending outwardly therefrom for connection to a central milk line under suction, the distance along the longitudinal plane of said milk outlet nipple between the outer end portion of said milk outlet nipple and the outer end portion of said arm being less than the external diameter of said milk tube.

6. A milking machine claw assembly comprising a rigid body having an air inlet and a hollow interior, a plurality of milk claw nipples mounted on said body and extending outwardly therefrom and being in fluid communication with the hollow interior of said body and each being adapted to be connected to the milk tube of an inflation to conduct milk from the latter into the hollow interior of said body, a milk outlet nipple mounted on said body and extending outwardly therefrom and being in fluid communication with the hollow interior of said body and being adapted to have a flexible milk tube under suction connected thereto, the outer end portion of said milk outlet having a milk tube crimping surface extending at an acute angle to the longitudinal axis of said milk outlet nipple, and a rigid hookshaped milk tube shut-off arm mounted on said body beside said milk outlet nipple and extending outwardly therefrom in the same general direction as said milk outlet nipple, the hook portion of said arm extending toward said outlet and outwardly a short distance therebeyond and a short distance across the longitudinal plane of said milk outlet nipple normal to the plane of its crimping surface, said hook-shaped portion of said arm extending to the side of the longitudinal axis of said milk outlet nipple opposite to the direction in which its crimping surface faces whereby such a flexible milk tube when connected to said milk outlet nipple may extend in milk-conducting position while at one side of said arm and will be crimped against the crimping surface of said milk outlet nipple when swung to the other side of said arm to effectively shut-off the fluid flow through the milk tube.

References Cited in the file of this patent
UNITED STATES PATENTS

| | | |
|---|---|---|
| 470,776 | Beehler | Mar. 15, 1892 |
| 662,955 | McClelland | Dec. 4, 1900 |
| 2,204,677 | Hodson | June 18, 1940 |
| 2,329,396 | Dinesen | Sept. 14, 1943 |